United States Patent [19]

Arikawa

[11] Patent Number: 4,744,610
[45] Date of Patent: May 17, 1988

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[21] Appl. No.: 907,596

[22] Filed: Sep. 15, 1986

[30] Foreign Application Priority Data

Sep. 13, 1986 [JP] Japan ................................ 60-203982

[51] Int. Cl.$^4$ ............................................. B60T 17/18
[52] U.S. Cl. ....................................... 303/92; 303/111
[58] Field of Search .................... 188/181 A; 303/6 C, 303/92, 96, 98, 103, 106, 109, 110, 111, 119

[56] References Cited

U.S. PATENT DOCUMENTS

| 3,674,317 | 7/1972 | Mangold. | |
|---|---|---|---|
| 3,907,377 | 9/1975 | Mayer. | |
| 4,345,796 | 8/1982 | Reinecke | 303/92 |
| 4,451,096 | 5/1984 | Gygax | 303/109 |
| 4,494,801 | 1/1985 | Ohmori et al. | 303/92 |

Primary Examiner—Duane A. Reger

Attorney, Agent, or Firm—James P. Ryther

[57] ABSTRACT

A pair of front wheels are diagonally connected with a pair of rear wheels. A first fluid pressure control valve device is arranged between a first fluid pressure generating chamber of a tandem master cylinder and the wheel cylinder of one of the front wheels; a second fluid pressure control valve device is arranged between a second fluid pressure generating chamber of the tandem master cylinder and the wheel cylinder of the other of the front wheels. A valve apparatus, arranged between the wheel cylinders of the front wheels and the wheel cylinders of the rear wheels, supplies a fluid pressure to the rear wheels in accordance with the lower one of the brake fluid pressures of the front wheels as controlled by the fluid pressure control valve devices. The valve apparatus includes a pair of valve parts, and a piston or piston group, including a pair of fluid pressure receiving portions or piston members. When one of the two conduit systems fails, at least one of the valve parts belonging to the other functioning conduit system is maintained in the open state.

11 Claims, 6 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle baking system which can prevent the locking of the wheels.

2. Description of the Prior Art

The same assignee as this assignee previously proposed (U.S. Ser. No. 760,356 now U.S. Pat. No. 4,637,664) an anti-skid control apparatus for a vehicle braking system including a pair of front wheels; a first fluid pressure control valve device for controlling the brake fluid pressure of the wheel cylinder of one of the front wheels arranged between a first fluid pressure generating chamber of a tandem master cylinder and the wheel cylinder of the one front wheel; a second fluid pressure control valve device for controlling the brake fluid pressure of the wheel cylinder of another of the front wheels arranged between a second fluid pressure generating chamber of the tandem master cylinder and the wheel cylinder of the other front wheel; a control unit for measuring or judging the skid conditions of the front and rear wheels and for generating instructions for controlling the first and second fluid pressure control valve devices; and a valve apparatus for generating a fluid pressure in accordance with the lower one of the brake fluid pressures of the front wheels controlled by the first and second fluid pressure control valve devices, arranged between the wheel cylinders of the front wheels and those of the rear wheels.

For a counter-measure to the failure of the one of the two conduit systems in the above anti-skid control apparatus, a piston for opening and closing a pair of valve parts is slidably fitted into a sleeve. The fluid pressures of the fluid pressure generating chambers of the tandem master cylinder are applied to the end surfaces of the sleeve. When both of the two conduit systems are in order, the sleeve is located at the balanced neutral position. When one of the two conduit systems fails, the sleeve is moved in one direction, and so one of the valve parts arranged at either sides of the piston is forcibly maintained at the opened state. The piston is initially moved together with the sleeve, and then stopped by stopper means. The sleeve is further moved to maintain the one valve part at the opened state. Therefore, much fluid from the master cylinder is required for moving the sleeve and piston. Accordingly, the stroke of the brake pedal becomes large. Moreover, the above-described anti-skid control apparatus is complicated in construction.

Further, the counter-measure was proposed where the failure pistons are arranged at either side of the piston such that when one of the two conduit systems fails, one of the failure pistons is moved in one direction to maintain the one valve part forcibly at the opened state. However, in this counter-measure a large quantity of fluid is required for moving the one failure piston and the piston for opening and closing the valve parts.

SUMMARY OF THE INVENTION

Accordingly, it is an object of this invention to provide an anti-skid control apparatus for a vehicle braking system which can cope with the failure without increasing the fluid supply amount from the master cylinder.

In accordance with an aspect of this invention, an anti-skid control apparatus for a vehicle braking system is provided including: (A) a pair of front wheels, and a pair of rear wheels, (B) a first fluid pressure control valve device, for controlling the brake fluid pressure of the wheel cylinder of one of said front wheels, arranged between a first fluid pressure generating chamber of a tandem master cylinder and said wheel cylinder of the one front wheel; (C) a second fluid pressure control valve device, for controlling the brake fluid pressure of the wheel cylinder of another of said front wheels, arranged between a second fluid pressure generating chamber of said tandem master cylinder and said wheel cylinder of the other front wheel; (D) a control unit for measuring or judging the skid conditions of said front and rear wheels and for generating instructions for controlling said first and second fluid pressure control valve devices; and (E) a valve apparatus, for generating a fluid pressure in accordance with the lower one of the brake fluid pressures of said front wheels controlled with said first and second fluid pressure control valve devices, being arranged between said wheel cylinders of the front wheels and those of the rear wheels. The improvements in which said valve apparatus comprises a pair of valve parts each for opening and closing a conduit between the wheel cylinders of the ones of said front and rear wheels in the corresponding one of the two conduit systems, and a piston or a piston group consisting of plural piston members, including a pair of fluid pressure receiving portions or piston members which receive the fluid pressure of the corresponding one of said first and second fluid pressure generating chambers of the tandem master cylinder, and the fluid pressure of the corresponding one of the wheel cylinders of said front wheels in the opposite directions. The said piston or piston group is located normally at a neutral position for opening said valve parts and is movable to selectively close any one of the valve parts due to the difference between the fluid pressures of the wheel cylinders of the front wheels during the skid control operation. When one of the two conduit systems fails, said piston or piston group is moved in the corresponding one of the opposite directions by the fluid pressure difference between the first and second fluid pressure generating chambers of the tandem master cylinder so as to maintain forcibly the one valve part at the opened state, said one valve part being for opening and closing the conduit of the other normal conduit system, or said piston or piston group is maintained at the neutral position so as to maintain said both valve parts at the opened state.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
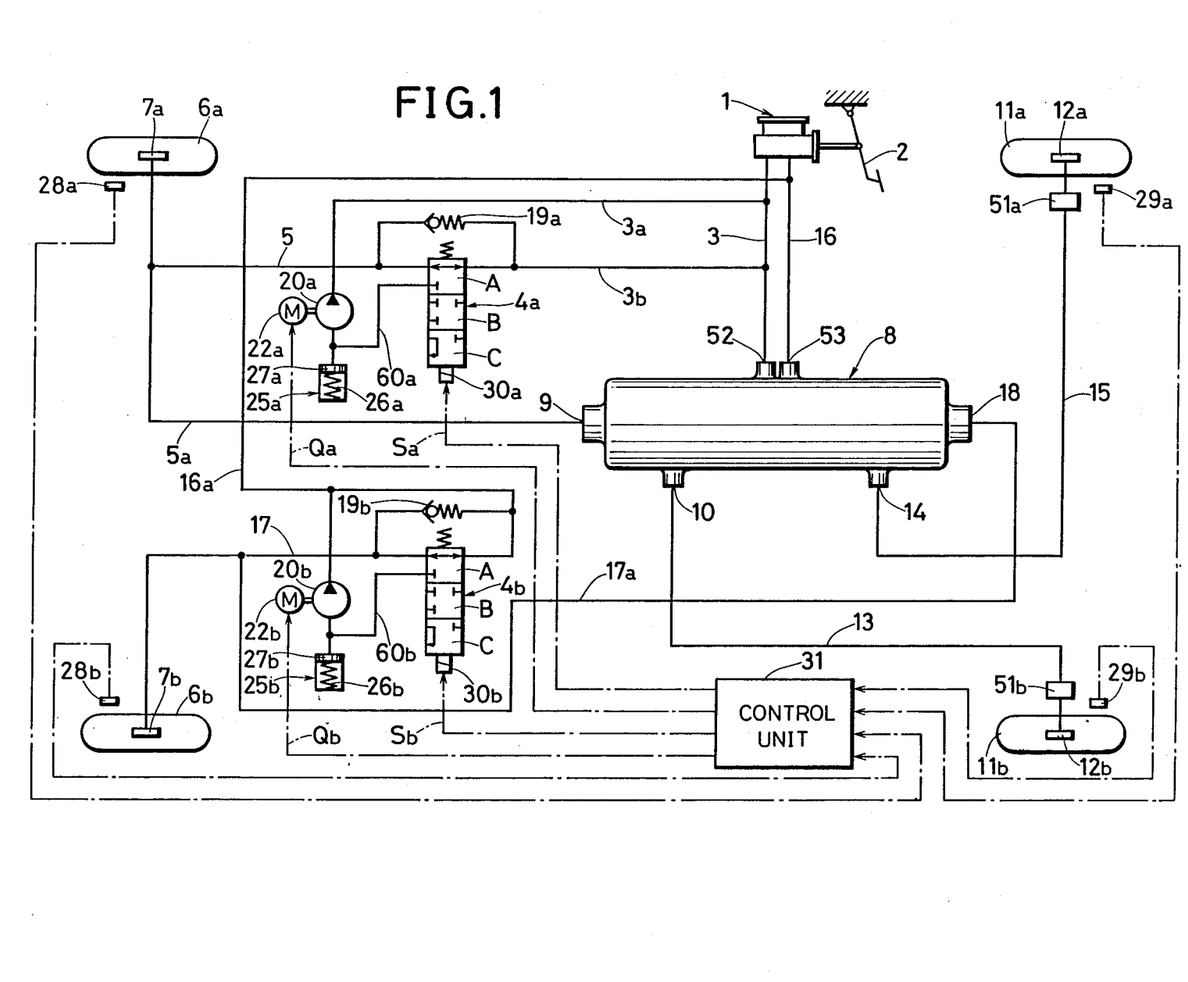
FIG. 1 is a schematic view of an anti-skid control apparatus according to a first embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic three position valve device 4a and a conduit 5. The conduit 5 is further connected to a first input port 9 of a valve apparatus 8 to be hereinafter described in detail. The first input port 9 normally communicates with a first output port 10 in the valve apparatus 8. The first output port 10 is connected to a wheel cylinder 12b of a left rear wheel 11b through a conduit 13 and a proportioning valve 51b.

Another fluid pressure chamber of the tandem master cylinder 1 is connected to a wheel cylinder 7b of a left front wheel 6b through a conduit 16a, an electro-magnetic three position valve device 4b and a conduit 17. The conduit 17 is further connected to a second input port 18 of the valve apparatus 8. The second input port 18 normally communicates with a second output port 14 in the valve apparatus 8. The second output port 14 is connected to a wheel cylinder 12a of a right rear wheel 11a through a conduit 15 and a proportioning valve 51a.

Discharge openings of the valve devices 4a and 4b are connected through conduits 60a and 60b to hydraulic reservoirs 25a and 25b, respectively. The hydraulic reservoirs 25a and 25b include pistons 27a and 27b slidably fitted to a casing and relatively week springs 26a and 26b. Reserving chambers of a reservoirs 25a and 25b are connected to suction openings of fluid pressure pumps 20a and 20b.

Although the fluid pressure pumps 20a and 20b are schematically shown, each of them consist of a pair of casings, pistons slidably fitted to a casings, an electro-motor 22a or 22b reciprocating the piston, and check valves. Supply openings of the fluid pressure pump 20a and 20b are connected to the conduits 3a and 16a.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31.

The control unit 31 has well-known circuits. On the basis of the detecting outputs of the wheel speed sensors 28a, 28b, 29a, and 29b, the skid condition or rotational condition of the wheels, namely wheel speeds of the wheels, approximate vehicle speed, slips thereof, and accelerations or decelerations thereof are calculated or measured by the control unit 31. Control signals Sa and Sb as the calculation or measurement results are generated from the control unit 31, and are supplied to solenoid portions 30a and 30b of the valve devices 4a and 4b. Dash lines represent electric lead wires.

Although schematically shown, the electromagnetic valve devices 4a and 4b have well-known constructions. When the control signals Sa and Sb are "0", the valve devices 4a and 4b take first positions A for increasing the brake pressure to the brake for the wheels.

In the first position A, the master cylinder side and the wheel cylinder side are made to communicate with each other. When the control signals Sa and Sb are "½", the valve devices 4a and 4b take second positions B for maintaining a constant brake pressure to the brakes. In the second position B, the communications between the master cylinder side and the wheel cylinder side, and between the wheel cylinder side and the reservoir side are interrupted. When the control signals Sa and Sb are "1", the valve devices 4a and 4b take third positions C for decreasing the brake pressure to the brakes. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b.

The control unit 31 further generates drive signal Qa, Qb for the motors 22a and 22b. When any of the control signals Sa and Sb becomes initially "½" or "1", the corresponding drive signals Qa or Qb is generated, and it is maintained during the skid control operation. The drive signals Qa, Qb are supplied to the motors 22a and 22b.

Figure 2:
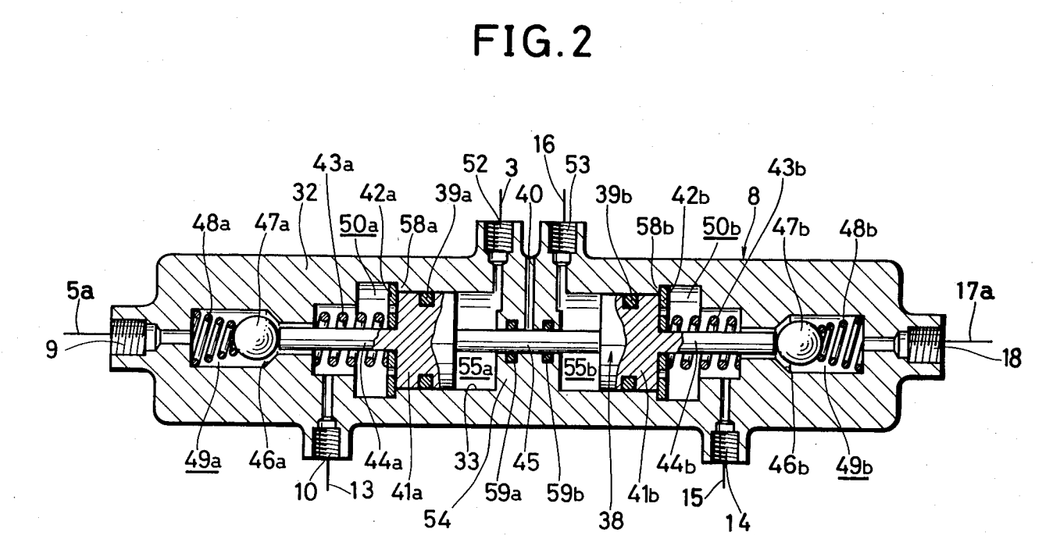
FIG. 2 is an enlarged cross-sectional view of a valve apparatus in FIG. 1.

Next, the details of the valve apparatus 8, to which the brake fluid pressures are applied from the wheel cylinders 7a and 7b of the front wheels 6a and 6b, will be described with reference to FIG. 2.

A stepped through hole 33 is axially formed in a casing 32 for the valve apparatus 8. The above-described first and second input ports 9 and 18 are formed in the left and right openings, respectively.

A stepped piston 38 provided with seal rings 39a and 39b is slidably fitted to a central position of the stepped hole 38. The stepped piston 33 is symmetrical, and it consists of a pair of larger-diameter portions 41a and 41b, a pair of rod portions 44a and 44b and a smaller-diameter portion 45 combining integrally the larger-diameter portions 41a and 41b. The small diameter portion 45 is slidably fitted into a central hole of a partition 54 of the casing 32, sealed with seal rings 59a and 59b.

Spring receiving rings 42a and 42b are fitted to the rod portions 44a and 44b, and they receive springs 43a and 43b. The stepped piston 38 is urged to the center of the stepped hole 33 by the springs 43a and 43b, and so it is normally maintained at a neutral position as shown in FIG. 2. The spring receiving rings 42a and 42b normally contact with stepped portions 58a and 58b formed in the inner wall of the casing 32. Thus, the inside positions of the rings 42a and 42b are determined by their abutting relationship with stepped portions 58a and 58b, respectively.

Normally, the rod portions 44a and 44b of the piston 38 contact with valve balls 47a and 47b which are positioned in input chambers 49a and 49b, and are urged inwards by springs 48a and 48b. In the illustrated condition, the valve balls 47a and 47b are separated from valve seats 46a and 46b by the rod portions 44a and 44b.

Output chambers 50a and 50b, and master cylinder pressure chambers 55a and 55b are formed at both sides of the larger-diameter portions 41a and 41b of the piston 38. The output chambers 50a and 50b always communicate with the above-described output ports 10 and 14. The master cylinder pressure chambers 55a and 55b always communicate with the fluid pressure chambers of the tandem master cylinder 1 through connecting ports 52 and 53 and the conduits 3 and 16 connected to the ports 52 and 53. Small openings are formed in the spring receiving rings 42a and 42b, so that the larger-diameter portions 41a and 41b of the piston 38 can easily receive the fluid pressure at the outside surfaces.

According to this embodiment, the surfaces of the larger-diameter portions 41a and 42b of the piston 38, that receives fluid pressures from the output chambers 50a and 50b, and the master cylinder pressure chambers 55a and 55b are annular. These annular pressure-receiving surfaces are equal to each other in area. In other words, the diameters of the rod portions 44a and 44b are equal to the diameter of the smaller-diameter portions 45.

In FIG. 1, check valves 19a and 19b are connected in parallel with the electromagnetic valve devices 4a and 4b. They permit brake fluid to flow only in the direction from the wheel cylinder side towards the master cylinder side. Both sides of the valve devices 4a and 4b communicate with each other through throttling holes in the A- positions. Accordingly, pressurized fluid is rapidly returned through the check valves 19a and 19b to the master cylinder 1 from the wheel cylinders 7a, 7b, 12a and 12b, when the brake is released.

Also when the brake pedal 2 is released and the valve devices 4a and 4b are in the B or C positions during the skid control, the brake fluid can be returned from the wheel cylinder side to the master cylinder side through the check valves 19a and 19b.

Next, there will be described operations of the above described anti-skid apparatus.

It is now assumed that both of the conduit systems are in order, and the wheels 6a, 6b, 11a and 11b run on the road which is uniform in frictional coefficient.

The vehicle driver treads the brake pedal 2. At the beginning of the braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3, 16, the valve devices 4a, 4b and the conduits 5, 17. Further, the pressurized fluid is supplied to the wheel cylinders 12a and 12b of the rear wheels 11a and 11b through the first and second input ports 9, 18, the input chambers 49a, 49b, the output chambers 50a, 50b, the first and second output ports 10, 14 in the valve apparatus 8, the conduits 13 and 15 and the proportioning valves 51a and 51b. Thus, the wheels 6a, 6b, 11a and 11b are braked.

The fluid pressures of the fluid pressure generating chambers of the master cylinder 1 rise substantially at the same rate. Accordingly, the pressures of the master cylinder pressure chambers 55a and 55b are substantially equal to each other in the valve apparatus 8. Further, the pressures of the output chambers 50a and 50b, and therefore the input chambers 49a and 49b, when the valve balls 47a and 47b are separated from the valve seats 46a and 46b, are substantially equal to each other. Accordingly, the piston 38 is not moved, and remains positioned at the shown neutral position.

When the deceleration or slip ratio of the wheels 6a, 6b, 11a and 11b becomes higher than the predetermined deceleration or slip ratio as the brake fluid pressure is increased, the control signals Sa and Sb become high level "1". The solenoid portions 30a and 30b are energized. The valves 4a and 4b take the third position C. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13, the output ports 14, 10, the output chambers 50b, 50a, the input chambers 49b, 49a, the input ports 18, 9 in the valve apparatus 8, and the conduits 17a, 5a, 60b and 60a, into the hydraulic reservoirs 25b and 25a. Thus, the brakes of the wheels 6a, 6b, 11a and 11b are relieved.

The brake fluid is sucked from the reservoirs 25a and 25b and supplied towards the conduits 3a and 16a, nearly at the same rate by the fluid pressure pumps 20a and 20b. Accordingly, the fluid pressures of the output chambers 50a and 50b at both sides of the piston 38 are decreased nearly at the same rate. The piston 38 remains stopped at the neutral position, and the valve balls 47a and 47b remain separated from the valve seats 46a and 46b.

According to the control unit 31 of this embodiment, when the deceleration of the wheels 6a and 6b becomes lower than the predetermined deceleration, the control signals Sa and Sb become middle level "½". The valves 4a and 4b take the second position B. The conduits 3b, 16a are interrupted from the conduits 5, 17. Further, the conduits 5, 17 are interrupted from the conduits 60a, 60b. Thus the brake fluid pressures of the wheel cylinders 7a, 7b, 12a and 12b are maintained constant. The fluid pressure pumps 20a and 20b continue to supply brake fluid towards the conduits 3 and 16.

When the skid conditions of the wheels 6a, 6b, 11a and 11b are removed, the control signals Sa and Sb become again low level "0". The valves 4a and 4b take the position A. The master cylinder side is made to communicate with the wheel cylinder side. The braking forces to the wheels 6a, 6b, 11a and 11b again increases.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a and 12b to the master cylinder 1 through the conduits, the valve apparatus 8, the valves 4a, 4b, the check valves 19a and 19b.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Next, such a case will be described.

The operations as the beginning of the braking are the same as above described. When the control signal Sa becomes "1", the valve 4a takes the position C. Pressurized fluid is discharged into the reservoir 25a from the wheel cylinders 7a and 12b.

In the valve apparatus 8, the fluid pressure is decreased in the input and output chambers 49a and 50a at the left side of the piston 38. On the other hand, the brake fluid continues to be supplied to the wheel cylinders 7b and 12a from the master cylinder 1. Accordingly, the leftward pushing force to the piston 38 becomes larger. The piston 38 is moved leftwards. Thus, the right valve ball 47b comes to seat in the valve slat 46b by spring action of the spring 48b. On the other hand, the left valve ball 47a is further separated from the valve slat 46a by the rod portion 44a. The left input chamber 49a remains in communication with the left output chamber 50a, while the right input chamber 49b is interrupted from the right output chamber 50b. Thus, the fluid suply to the wheel cylinder 12a of the one rear wheel 11a is interrupted from the master cylinder 1.

When the piston 38 is further moved leftwards with the decrease of the fluid pressure of the left input and output chambers 49a and 50a, the volume of the right output chamber 49b interrupted from the right input chamber 49b is increased. In other words, the fluid pressure of the wheel cylinder 12a of the rear wheel 11a is lowered since the wheel cylinder 12a communicates with the right output chamber 50b through the output port 14 and the conduit 15.

When the control signal Sa becomes again "0" to thereby increase the fluid pressure of the input and output chambers 49a and 50a, the piston 38 is moved rightwards to decrease the volume of the right output chamber 50b, while the right valve ball 47b seats in the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinders 7a of the front wheel 6a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the front wheel 6b running on the higher frictional coefficient side, the rear wheel 11a would be locked.

Next, there will be described the case that one of the two conduit systems fails.

For example, when the brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increases by treading the brake pedal 2. Accordingly in the valve apparatus 8, the fluid pressure of the one master cylinder pressure chamber 55b rises, while that of the other master cylinder pressure chamber 55a remains zero. Thus, the fluid pressures at both sides of the one larger-diameter portion 41a of the piston 38 are zero. The pressures at both sides of the other larger-diameter portion 41b of the piston 38 are not zero, and substantially equal to each other. As the result, the piston 38 is not moved, and remains located at the shown neutral position. Accordingly, the valve ball 47b remains separated from the valve seat 46b.

Thus, in the operable conduit system, the pressurized fluid is supplied from the master cylinder 1 into the wheel cylinder 7b of the left front wheel 6b through the conduits 16, 16a, the valve 4b and the conduit 17. Further, it is supplied from the master cylinder 1 into the wheel cylinder 12a of the right rear wheel 11a through the conduit 17a, the input chamber 49b of the valve apparatus 8, the output chamber 50b thereof (the valve ball 47b opened), and the conduit 15. Thus, the braking force can be securely obtained in the one conduit system.

When the valve 4b is changed over into the position B or C with the tendency of the locking of the front or rear wheel 6b or 11a, the fluid pressure of the input and output chambers 49b and 50b becomes lower than that of the master cylinder pressure chamber 55b such that the piston 38 is moved rightwards due to the fluid pressure difference between opposite sides of the larger diameter portion 41b. Accordingly, the valve ball 47b is moved further rightwards and separated far from the valve seat 46b. The valve ball 47b remains separated.

When the valve 4b is changed over into the position B, the wheel cylinders 7b and 12a of the wheels 6b and 11a are interrupted both from the master cylinder and from the reservoir 25b. Thus the fluid pressure of the wheel cylinders 7b and 12a increases with the rightward movement of the piston 38, since the volume of the input and output chambers 49b and 50b decreases therewith.

When the valve 4b is changed over into the position C, the wheel cylinders 7b and 12a of the wheels 6b and 11a are interrupted from the master cylinder side, but communicate with the reservoir side. Thus, the braking forces of the front and rear wheels 6b and 11a are decreased, so that the wheels are prevented from locking.

As described above, the braking force can be securely obtained in the one conduit system, even when the other conduit system fails. The special sleeve and position are not required for opening the valve ball in the one right conduit system, as in the prior art. Accordingly, the large amount of fluid used for moving the special sleeve and piston is not needed, and the stroke of the brake pedal 2 does not become excessive.

Figure 3:
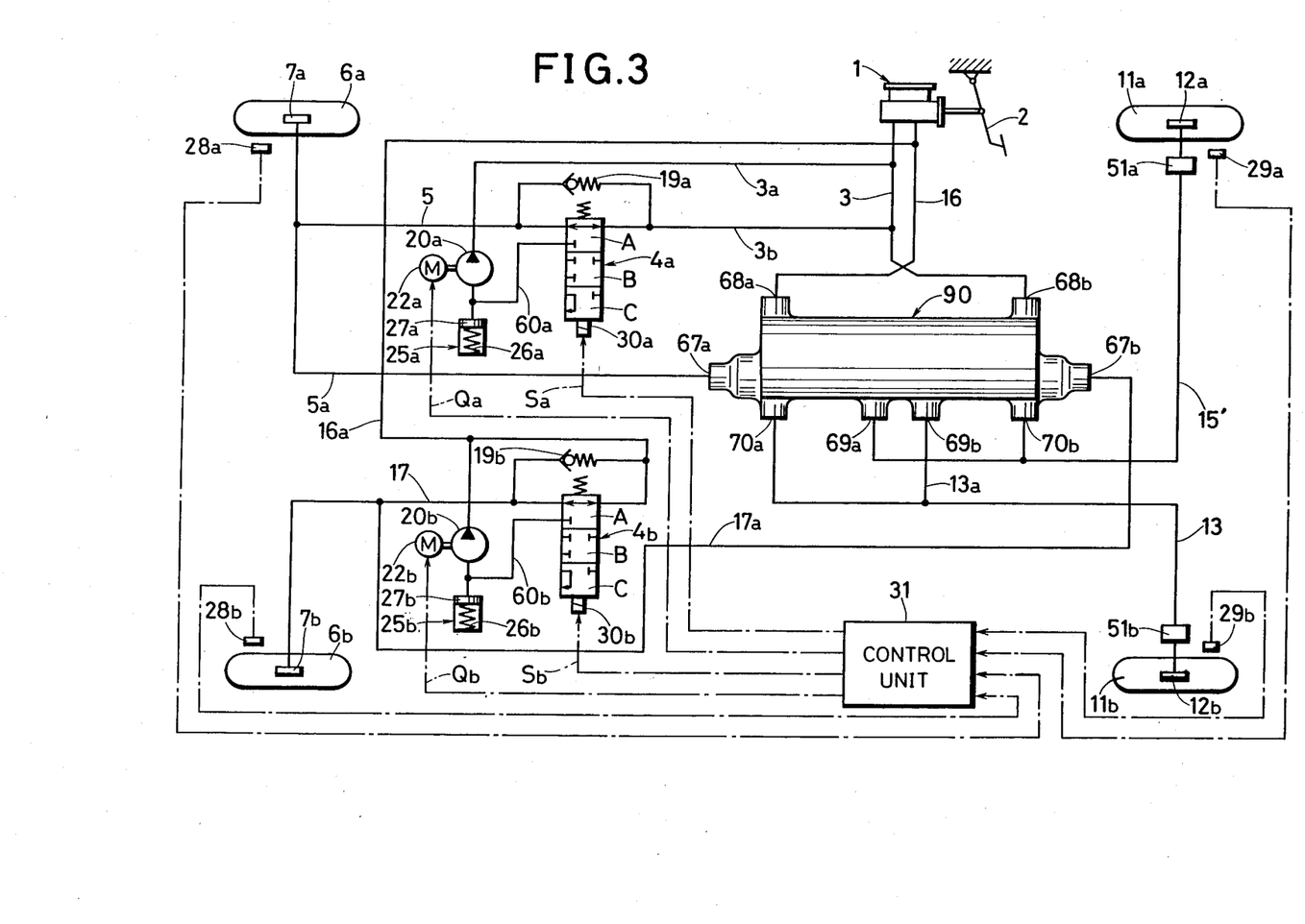
FIG. 3 is a schematic view of an anti-skid control apparatus according to a second embodiment of this invention.

Next, an anti-skid control apparatus according to a second embodiment of this invention will be described with reference to FIG. 3 and FIG. 4. Parts in FIG. 3 and FIG. 4 which correspond to those in FIG. 1 and FIG. 2, are denoted by the same reference numerals, the description of which will be omitted.

Figure 4:
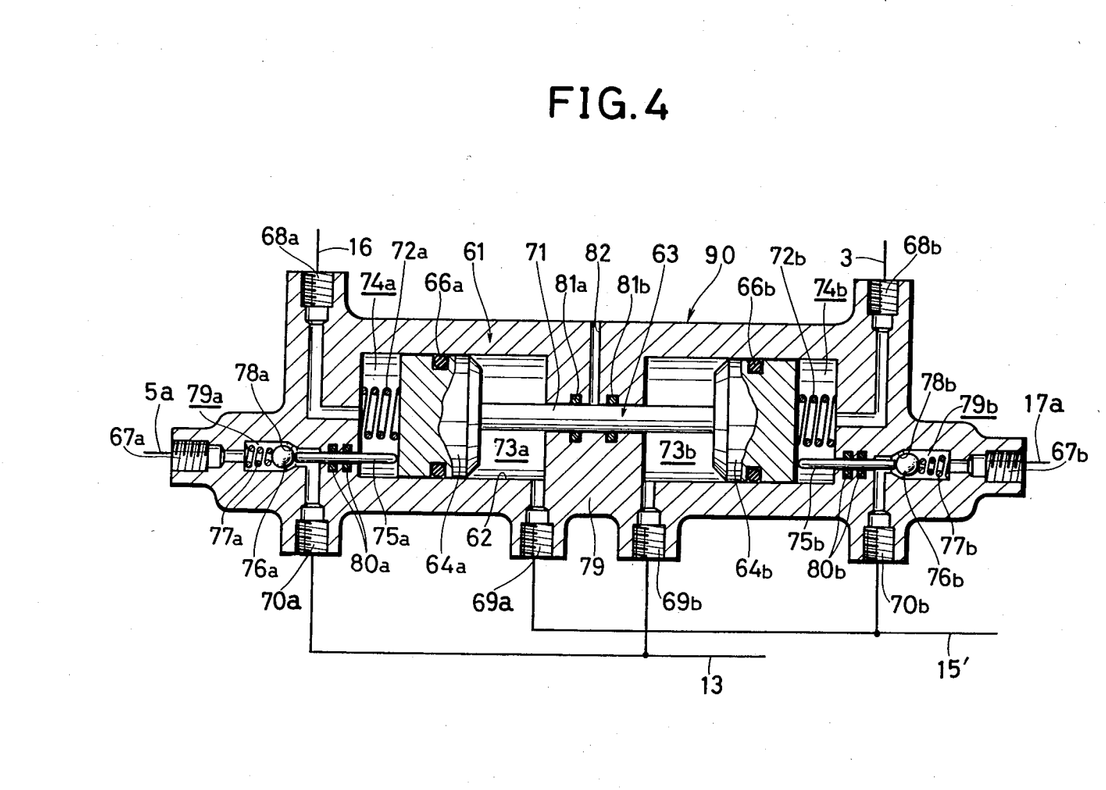
FIG. 4 is an enlarged cross-sectional view of a valve apparatus in FIG. 3.

In FIG. 4, an axial through hole 62 is made in a casing 61 for a valve apparatus 90. A piston group 63 consisting of three members is slidably fitted to the stepped hole 62. The three members are a pair of larger-diameter pistons 64a and 64b and a smaller-diameter piston 71. The larger-diameter pistons 64a and 64b are provided with seal rings 66a and 66b. Output chambers 73a and 73b are formed at the insides of the larger-diameter pistons 64a and 64b. Master cylinder pressure chambers 74a and 74b are formed at the outsides of the larger-diameter pistons 64a and 64b. The smaller-diameter piston 71 is slidably fitted to a central hole of a partition 79 of the casing 61, sealed with seal rings 81a and 81b. A space between the seal rings 81a and 81b communicates through a vent 82 with the atmosphere. The larger-diameter pistons 64a and 64b are urged inwards by springs 72a and 72b which are equal to each other in spring force. Thus, the piston group 63 is normally located at a shown neutral position.

The master cylinder pressure chambers 74a and 74b, and the output chambers 73a and 73b communicate with the conduits 16, 3, 15' and 13 through connecting ports 68a and 68b, and output ports 69a and 69b, respectively.

Valve rods 75a and 75b sealed with seal rings 80a and 80b are slidably fitted to axial holes made in the end walls of the casing 61. Inner ends of the valve rods 75a and 75b contact with the outer surfaces of the larger-diameter pistons 64a and 64b. Outer ends thereof contact with valve balls 76a and 76b urged by springs 77a and 77b. When the position group 63 is located at the shown neutral position, the valve balls 76a and 76b are separated from valve seats 78a and 78b, as shown in FIG. 4. Valve chambers 79a an 79b in which the springs 77a and 77b are compressed, correspond to the input chambers 49a and 49b of the first embodiment, and they communicate with the conduits 5a and 17a through input ports 67a and 67b, respectively.

Next, there will be described operations of the above-described apparatus of the second embodiment.

First, it is assumed that both of the two conduit systems are in order, and the right front and rear wheels 6a and 11a are running on the frictionally lower side of the road, as in the first embodiment.

When the valve 4a is changed over into the position C with the start of the skid control operation, the pressurized fluid is discharged from the wheel cylinder 7a of the right front wheel 6a into the reservoir 25a through the conduit 60a, and from the wheel cylinder 12b of the left rear wheel 11b into the reservoir 25a through the conduit 13, the output port 70a of the valve apparatus 90, the space between the valve ball 76a and the valve seat 78a therein, the input port 67a thereof, and the conduits 5a and 60a. Thus, the brakes of the wheels 6a and 11b are relieved.

In the valve apparatus 90, the fluid pressure decreases in the one output chamber 73b, while it increases in the other output chamber 73a. Accordingly, the whole of the piston group 63 is moved leftwards. The right valve ball 76b comes to contact with the valve seat 78b. Thus, the valve ball 76b closes. On the other hand, the left valve rod 75a is moved leftwards, and the valve ball 76a is further separated from the valve seat 78a. Thus, the valve ball 76a is maintained at the open state.

The volume of the one output chamber 73a increases with the leftward movement of the piston group 63. Now the one output chamber 73a is interrupted from the wheel cylinder 7b of the left front wheel 6b. Accordingly, the fluid pressure of the wheel cylinder 12a of the right rear wheel 11a, that always communicates with the one output chamber 73a, decreases with the increase of the volume of the chamber 73a. The other operations in the case that both of the two conduit systems are in order, are the same as in the first embodiment.

Next, there will be described the case where one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increases by treading the brake pedal 2. Accordingly in the valve apparatus 90, the fluid pressure of the one master cylinder pressure chamber 74a rises, while that of the other master cylinder pressure chamber 74b remains zero. Thus, the fluid pressures to both sides of the one larger diameter piston 64b are zero. Those to both sides of the other larger-diameter piston 64a are not zero, and substnatially equal to each other. As the result, the piston group 63 is not moved, and remains located at the shown neutral position. Accordingly, the valve balls 76a and 76b remain separated from the valve seat 78a and 78b, as shown.

Thus, in the right conduit system, the pressurized fluid is supplied from the master cylinder 1 into the wheel cylinder 7b of the left front wheel 6b through the conduits 16, 16a, the valve 4b and the conduit 17. Further, it is supplied from the master cylinder 1 into the wheel cylinder 12a of the right rear wheel 11a through the conduit 17a, the valve chamber 79b of the valve apparatus 90, and the conduit 15. Thus, the braking force can be securely obtained in the one conduit system.

When the valve 4b is changed over into the position B or C with the tendency of the locking of the front or rear wheel 6 or 11a, the fluid pressure of the output chamber 73a becomes lower than that of the master cylinder pressure chamber 74a, in the valve apparatus 90, such that the piston group 63 is moved rightwards with the fluid pressure difference between both sides of the larger diameter piston 64a. Accordingly, the valve ball 76b is moved further rightwards and separated far from the valve seat 78b. The valve ball 76b remains separated from the valve seat 78b.

When the valve 4b changed over into the position B, the wheel cylinders 7b and 12a of the wheels 6b and 11a are interrupted both from the master cylinder and from the reservoir 25b. As a result the fluid pressure of the wheel cylinders 7b and 12a increases with the rightward movement of the piston group 63, since the volume of the output chamber 73a decreases therewith.

When the valve 4b is changed over into the position C, the wheel cylinders 7b and 12a of the wheels 6b and 11a are interrupted from the master cylinder side, but communicate with the reservoir side. Thus, the braking forces of the front and rear wheels 6b and 11a are decreased, so that the wheels are prevented for locking.

As above described, the braking force can be securely obtained in the operable conduit system, even when the other conduit system fails. The special sleeve and piston are not required for opening the valve ball in the one right conduit system, as in the prior art. Accordingly, the fluid amount for moving the special sleeve and piston is not needed, and the stroke of the brake pedal 2 does not become excessive.

Figure 5:
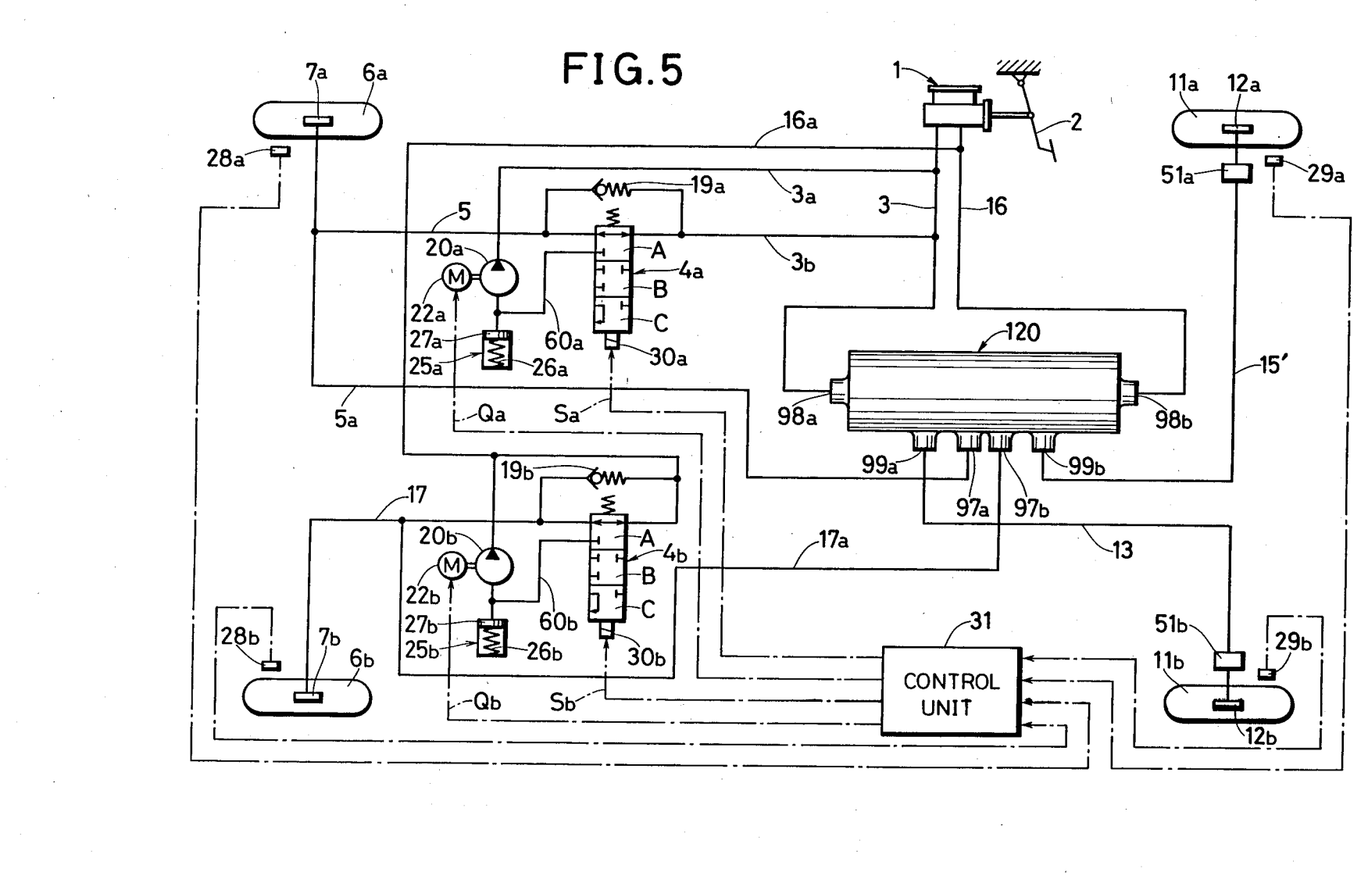
FIG. 5 is a schematic view of an anti-skid control apparatus according to a third embodiment of this invention.

Next, anti-skid control apparatus according to a third embodiment of this invention will be described with reference to FIG. 5 and FIG. 6. Parts in FIG. 5 and FIG. 6 which correspond to those in FIG. 1 and FIG. 2, are denoted by the same reference numerals, the description of which will be omitted.

Figure 6:
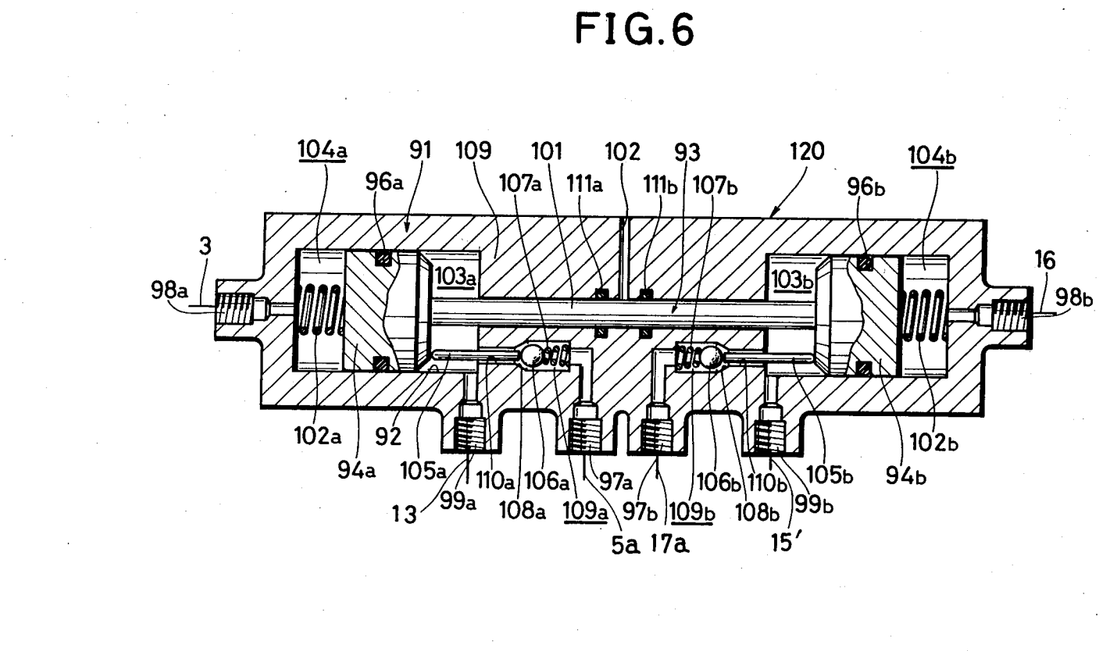
FIG. 6 is an enlarged cross-sectional view of a valve apparatus in FIG. 5.

In FIG. 6, an axial through hole 92 is made in a casing 91 for a valve apparatus 120. A piston group 93 consisting of three members is slidably fitted to the stepped hole 92. The three members are a pair of larger-diameter pistons 94a and 94b and a smaller-diameter piston 101. The larger-diameter pistons 94a and 94b are provided with seal rings 96a and 96b. Output chambers 103a and 103b are formed at the insides of the larger-diameter pistons 94a and 94b. Master cylinder pressure chambers 104a and 104b are formed at the outsides of the larger-diameter pistons 94a and 94b. The smaller-diameter piston 101 is slidably fitted to a central hole of a partition 109 of the casing 91, sealed with seal rings 111a and 111b. A space between the seal rings 111a and 111b communicates through a vent 102 with the atmosphere. The larger-diameter pistons 94a and 94b are urged inwards by springs 102a and 102b which are equal to each other in spring force. Thus, the piston group 93 is normally located at the illustrated neutral position.

The master cylinder pressure chambers 104a and 104b, and the output chambers 103a and 103b communicate with the conduits 3, 16, 13 and 15' through connecting ports 98a and 98b, and output ports 99a and 99b, respectively.

Valve rods 105a and 105b are slidably fitted to axial holes 110a and 110b made in the partition 109 of the casing 91. Outer ends of the valve rods 105a and 105b contact with the inner surfaces of the larger-diameter pistons 94a and 94b. Inner ends thereof contact with the valve balls 106a and 106b urged by springs 107a and 107b. When the piston group 93 is located at the shown neutral position, the valve balls 106a and 106b are separated from valve seats 108a and 108b, as shown in FIG. 6. Valve chambers 109a and 109b in which the springs 107a and 107b are compressed, correspond to the input chambers 49a and 49b of the first embodiment, and they communicate with the conduits 5a and 17a through input ports 97a and 97b, respectively.

Next, there will be described operations of the above-described apparatus of the third embodiment.

First, it is assumed that both of the two conduit systems are in order, and the right front and rear wheels 6a and 11a are running on the frictionally lower side of the road, as in the first embodiment.

When the valve 4a is changed over into the position C with the start of the skid control operation, the pressurized fluid is discharged from the wheel cylinder 7a of the right front wheel 6a into the reservoir 25a through the conduit 60a, and at the same time the fluid is discharged from the wheel cylinder 12b of the left rear wheel 11b into the reservoir 25a through conduit 13, the output port 99a of the valve apparatus 120, the space between the valve ball 106a and the valve seat 108a therein, the input port 97a thereof, and the conduits 5a and 60a. Thus, the brakes of the wheel 6a and 11b are relieved.

In the valve apparatus 120, the fluid pressure decreases in the one output chamber 103a, while it increases in the other output chamber 103b. Accordingly, the whole of the piston group 93 is moved rightwards. The right valve rod 105b is moved rightwards, and the valve ball 106b comes to contact with the valve seat 108b. Thus, the valve ball 106b closes. On the other hand, the left valve rod 105a is moved rightwards, and the valve ball 106a is further separated from the valve seat 108a. Thus, the valve ball 106a is maintained at the open state.

The volume of the one output chamber 103b increases with the rightward movement of the piston group 93. The one output chamber 103b is interrupted from the wheel cylinder 7b of the left front wheel 6b. Accordingly, the fluid pressure of the wheel cylinder 12a of the right rear wheel 11a that always communicates with the one output chamber 103b, decreases with the increase of the volume of the chamber 103b. The other operations in the case that both of the two conduit systems are operable, are the same as in the first embodiment.

The operations in the case that one of the two conduit systems fails, are substantially the same as in the second embodiment, the description of which will be omitted.

The number of the ports in the valve apparatus 120 of this embodiment is smaller than that of the ports in the valve apparatus 90 of the second embodiment. Further, the seal means for the valve rods 105a and 105b are not needed in contrast to the second embodiment. Accordingly, the cost of the third embodiement can be lower than that of the second embodiment.

In the valve apparatus 8 of the first embodiment, the piston 38 is a single body. For example, in the manufacture of the piston 38, the right larger-diameter portion 41b and rod portion 41b should be formed separately from the left larger-diameter portion 41a and rod portion 44a, and the smaller-diameter portion 45, and the latter should be fixed to the right larger-diameter portion 41b.

In the valve apparatus 90 and 120 of the second and third embodiments, the piston consists of three members which are separately formed from one another. Accordingly, the manufacturing and assembling of the valve apparatus of the second and third embodiments are simpler than those of the valve apparatus of the first embodiment.

While the preferred embodiments have been described, variations thereto will occur to those skilled in the art within the scope of the present inventive concepts which are delineated by the following claims.

For example, in the above embodiments, the diagonal or X-type conduit system has been described. Insteads, a front-rear separation conduit system or H-connection conduit system may be applied to this invention.

Further in the first embodiment, the fluid pressure-receiving areas of the surfaces at both sides of the larger-diameter positions 41a and 41b of the piston 38 are equal to each other. The surfaces at the side of the master cylinder pressure chambers 55a and 55b may be larger. Thus, the diameter of the smaller-diameter portion 45 may be smaller than that of the rod portions 44a and 44b. In that case, when one of the two conduit systems fails, the piston is moved in one direction with the treading of the brake pedal 2, and the one valve ball is separated further from the corresponding valve seat. Accordingly, the fluid pressures rise at a greater rate than the rise due to the movement of the piston.

Further, in the second and third embodiments, the larger-diameter pistons 64a, 64b or 94a, 94b may be stepped.

What is claimed is:

1. In an anti-skid control apparatus for a vehicle braking system including:
(A) a pair of front wheels and a pair of rear wheels;
(B) a first fluid pressure control valve device arranged in a first conduit system device for controlling the brake fluid pressure of the wheel cylinder of one of said front wheels, arranged between a first fluid pressure generating chamber of a tandem master cylinder and said wheel cylinder of said one front wheel;
(C) a second fluid pressure control valve device arranged in a second conduit system for controlling the brake fluid pressure of the wheel cylinder of the other of said front wheels, arranged between a second fluid pressure generating chamber of said tandem master cylinder and said wheel of the other front wheel;
(D) a control unit for measuring or judging the skid conditions of said front and rear wheels and for generating instructions for controlling said first and second fluid pressure control valve devices; and
(E) a valve apparatus for generating a fluid pressure in accordance with the lower one of the brake fluid pressures of said front wheels controlled with said first and second fluid pressure control valve devices, being arranged between said wheel cylinders of the front wheels and the wheel cylinders of the rear wheels; wherein said valve apparatus comprises a pair of valve parts each for opening and closing a conduit between the wheel cylinders of the ones of said front and rear wheels in the corresponding one of the two conduit systems, said valve parts being arranged so as to open and close in opposite directions with respect to one another, and a piston or piston group consisting of plural piston members, including a pair of fluid pressure receiving portions or piston members which receive the fluid pressure of the corresponding one of said first and second fluid generating chambers of the tandem master cylinder, and the fluid pressure of the corresponding one of the wheel cylinders of said front wheels in opposite directions, respectively, said piston or piston group is located normally at a neutral position for opening said valve parts and is movable in the directions to selectively close any one of said valve parts by the difference between the fluid pressures of the wheel cylinders of said front wheels during the skid operation and when one of the two conduit systems fails, said piston or piston group is moved in the corresponding one of the opposite directions by the fluid pressure difference between the first and second fluid pressure generating chambers of the tandem master cylinder so as to forcibly maintain the one valve part at the opened state, said one valve part being for opening and closing the conduit of the other normal conduit system, or said piston or said piston group is maintained at the neutral position so as to maintain said pair of valve parts at the opened state.

2. An anti-skid control apparatus according to claim 1, in which said piston includes a pair of larger-diameter portions corresponding to said fluid pressure receiving portions and a pair of rod portions extending outwardly from said larger diameter portions, and said valve parts each include a valve ball, a valve seat and a spring urging said valve ball towards said valve seat, said valve parts being arranged so as to open and close in opposite directions to each other, said larger-diameter portions receiving the respective ones of said first and second fluid pressure generating chambers of the tandem master cylinder at the respective inside surfaces, and receiving the respective ones of the fluid pressures of the wheel cylinders of the front wheels at the respective outside surfaces when said piston is located at the neutral position so as to open said valve parts, said valve balls being pushed outwards to the opened states by said rod portions.

3. An anti-skid control apparatus according to claim 1, in which said piston group includes a pair of larger-diameter piston members corresponding to said fluid pressure receiving piston members and said valve parts, each includes a valve ball, a valve seat, a valve rod normally contacting said valve ball, and a spring urging said valve ball towards said valve seat, said valve parts being arranged so as to open and close in opposite directions with respect to one another, said larger-diameter piston members receiving the respective ones of said first and second fluid generating chambers of the tandem master cylinder at the respective outside surfaces, and receiving the respective ones of the fluid pressures of the wheel cylinders of the front wheels at the respective inside surfaces when said piston group is located at the neutral position so as to open said valve parts, said valve balls being pushed outwards to the open states through said valve rods by said larger-diameter piston members.

4. An anti-skid control apparatus according to claim 3, in which said valve rods each contact the outside surface of said larger-diameter piston member, when said piston group is located at the neutral position.

5. An anti-skid control apparatus according to claim 1, in which said piston group includes a pair of larger- diameter piston members corresponding to said fluid pressure receiving piston members and said valve parts each includes a valve ball, a valve seat, a valve rod normally contacting said valve ball and a spring urging said valve ball towards said valve seat, said valve parts being arranged so as to open and close in opposite directions with respect to one another, said larger-diameter piston members receiving the respective ones of said first and second fluid pressure generating chambers of the tandem master cylinder at the respective outside surfaces, and receiving the respective ones of the fluid pressures of the wheel cylinders of the front wheels at the respective inside surfaces when said piston group is located at the neutral position so as to open said valve parts, said valve balls being pushed inwards to the open states through said valve rods by said larger-diameter piston members.

6. An anti-skid control apparatus according to claim 5, in which said valve rods each contact the inside surface of said larger-diameter piston member, when said piston group is located at the neutral position.

7. In an anti-skid control apparatus for a vehicle braking system including:
(A) a pair of front wheels and a pair of rear wheels each having a wheel cylinder;
(B) a tandem master cylinder having first and second fluid pressure generating chambers;
(C) a first conduit connecting said first fluid pressure generating chamber to the wheel cylinder of one of said pair of front wheels and a second conduit connecting said second fluid pressure generating chamber to the wheel cylinder of the other of said pair of front wheels;
(D) a first fluid pressure control valve device arranged in said first conduit for controlling the brake fluid pressure of the wheel cylinder of said one of said pair of front wheels and a second fluid pressure control valve device arranged in said second conduit for controlling the brake fluid pressure of the wheel cylinder of said other of said pair of front wheels;
(E) a control unit for measuring or judging the skid conditions of said front and rear wheels and for generating instructions for controlling said first and second fluid pressure control valve devices; and
(F) a valve apparatus controlled by said first and second fluid pressure control valve devices for generating a fluid pressure in accordance with the lower one of the brake fluid pressures of said front wheels, said valve apparatus connecting the wheel cylinder of one of said pair of front wheels to the wheel cylinder of one of said pair of rear wheels through a first conduit means and connecting the wheel cylinder of said other of said pair of front wheels to the wheel cylinder of the other of said pair of rear wheels through a second conduit means, said valve apparatus comprising:
a first valve means for opening and closing said first conduit means and a second valve means for opening and closing said second conduit means;
a piston means having a first fluid pressure receiving means and a second fluid pressure receiving means wherein each of said first and second fluid pressure receiving means includes opposed sides, one of said opposed sides of said first fluid pressure receiving means being in connection with said first fluid pressure generating chamber of said tandem master cylinder to receive fluid therefrom and one of said opposed sides of said second fluid pressure receiving means being in connection with said second fluid generating chamber of said tandem master cylinder to receive fluid therefrom;

the other of said opposed sides of said first fluid pressure receiving means being in connection with the wheel cylinder of said one of said pair of said front wheels and the other of said opposed sides of said second fluid pressure receiving means being in connection with the wheel cylinder of said other one of said pair of front wheels;

said piston being located normally at a neutral position wherein said first and second valve means open said first and second conduit means. said piston means being moved to close one of the first or second valve means upon actuation of said first or second fluid control valve devices, respectively, upon determination by said control unit of a skid condition where said piston means is moved by the fluid pressure difference between the first and second fluid generating chambers of the tandem master cylinder so as to maintain the valve means associated with the higher pressure fluid generating chambers open to thereby maintain the braking force in the conduit means associated with the higher pressure fluid generating chamber.

8. An anti-skid control apparatus according to claim 7, wherein said piston means incudes a pair of rod portions extending outwardly from said first and second fluid pressure receiving means, respectively, said rod portions having a smaller cross-sectional area than the area of said opposed sides, and said first and second valve means each includes a valve ball, a valve seat, and a spring urging said valve ball toward said valve seat, wherein said valve means are opened when said valve balls are pushed away from said valve seats by said rod portions.

9. An anti-skid control apparatus according to claim 8, wherein said rod portions are integrally formed with said first and second fluid pressure receiving means.

10. An anti-skid control apparatus according to claim 8, wherein said rod portions contact said one of said opposed sides of the first and second fluid pressure receiving means.

11. An anti-skid control apparatus according to claim 8, wherein said rod portions contact said other of said opposed sides of the first and second fluid pressure receiving means.

* * * * *